United States Patent
Weed

[15] 3,667,680
[45] June 6, 1972

[54] JET ENGINE EXHAUST NOZZLE SYSTEM

[72] Inventor: Willare N. Weed, Seattle, Wash.
[73] Assignee: The Boeing Company, Seattle, Wash.
[22] Filed: Apr. 24, 1970
[21] Appl. No.: 31,477

[52] U.S. Cl............239/265.17, 239/265.13, 239/265.29, 239/265.39, 181/33 HD, 60/261
[51] Int. Cl......................B63h 25/46, F02k 3/10
[58] Field of Search..............181/33.22, 33.221, 33.222; 239/127.3, 265.13, 265.11, 265.17, 265.19, 265.25, 265.27, 265.29, 265.31, 265.33, 265.37, 265.39, 265.41; 60/228, 261

[56] References Cited

UNITED STATES PATENTS

| | | | |
|---|---|---|---|
| 2,635,419 | 4/1953 | Ambrose et al. | 239/127.3 |
| 2,735,264 | 2/1956 | Jewett | 239/265.37 |
| 2,849,861 | 9/1958 | Gardiner et al. | 239/265.29 |
| 2,943,444 | 7/1960 | Baxter | 181/33 HC X |
| 2,955,418 | 10/1960 | David et al. | 181/33 HC X |
| 2,975,593 | 3/1961 | Bauger et al. | 239/265.27 |
| 3,002,342 | 10/1961 | Schatzki | 239/265.29 UX |
| 3,333,772 | 8/1967 | Bruner | 181/33 HD X |
| 3,344,882 | 10/1967 | Bellion et al. | 181/33 HC X |
| 3,420,442 | 1/1969 | Teagle | 181/33 HC X |
| 3,463,402 | 8/1969 | Langston | 181/33 HC X |

*Primary Examiner*—Richard B. Wilkinson
*Assistant Examiner*—John F. Gonzales
*Attorney*—Glenn Orlob and Kenneth W. Thomas

[57] ABSTRACT

A variable area two-stage ejection nozzle exhaust system for a turbojet engine having an afterburner, wherein, a primary nozzle has spherical segments contained within a spherical shell housing which spherical segments are pivotally adjustable in response to augmented and non-augmented engine operation to provide for an efficient exhaust nozzle exit area choke plane; and a secondary nozzle with aerodynamically actuated trailing edge flaps for varying the secondary exhaust nozzle exit area in response to primary nozzle pressure variations and airplane Mach number. Also provided within the primary nozzle are separate clamshell type blocker doors which, in combination with fluid flow turning vanes incorporated into the primary nozzle wall, turn the fluid flow to obtain reverse thrust from the turbojet engine.

For engine sound suppression, an increase in the primary nozzle exit area at power settings below normal cruise power produces a sound suppression mode through the over expansion of the exhaust gases.

At higher engine power settings, one embodiment for sound suppression is accomplished by rotating channel spokes into the exit gas flow and at the same time rotating internal clamshells to uncover openings to suppression tubes that are rotated outward into the free-stream airflow. The suppression tube exits are sized to equal the area of the flow blocked by the channel spokes to maintain engine/exhaust area match.

24 Claims, 21 Drawing Figures

PATENTED JUN 6 1972

INVENTOR,
WILLARD N. WEED
BY
[signature]
AGENT

INVENTOR,
WILLARD N. WEED
BY
AGENT

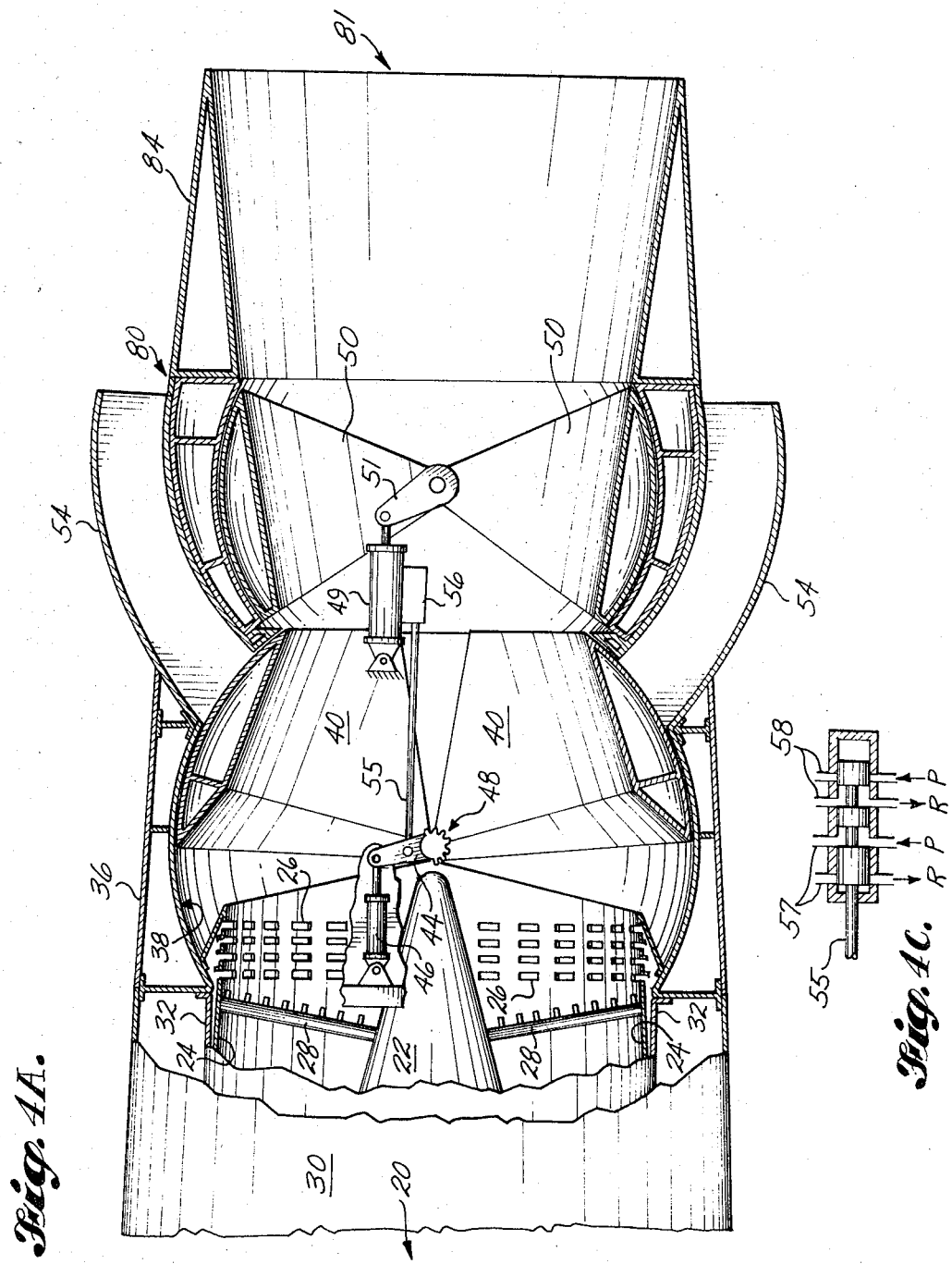

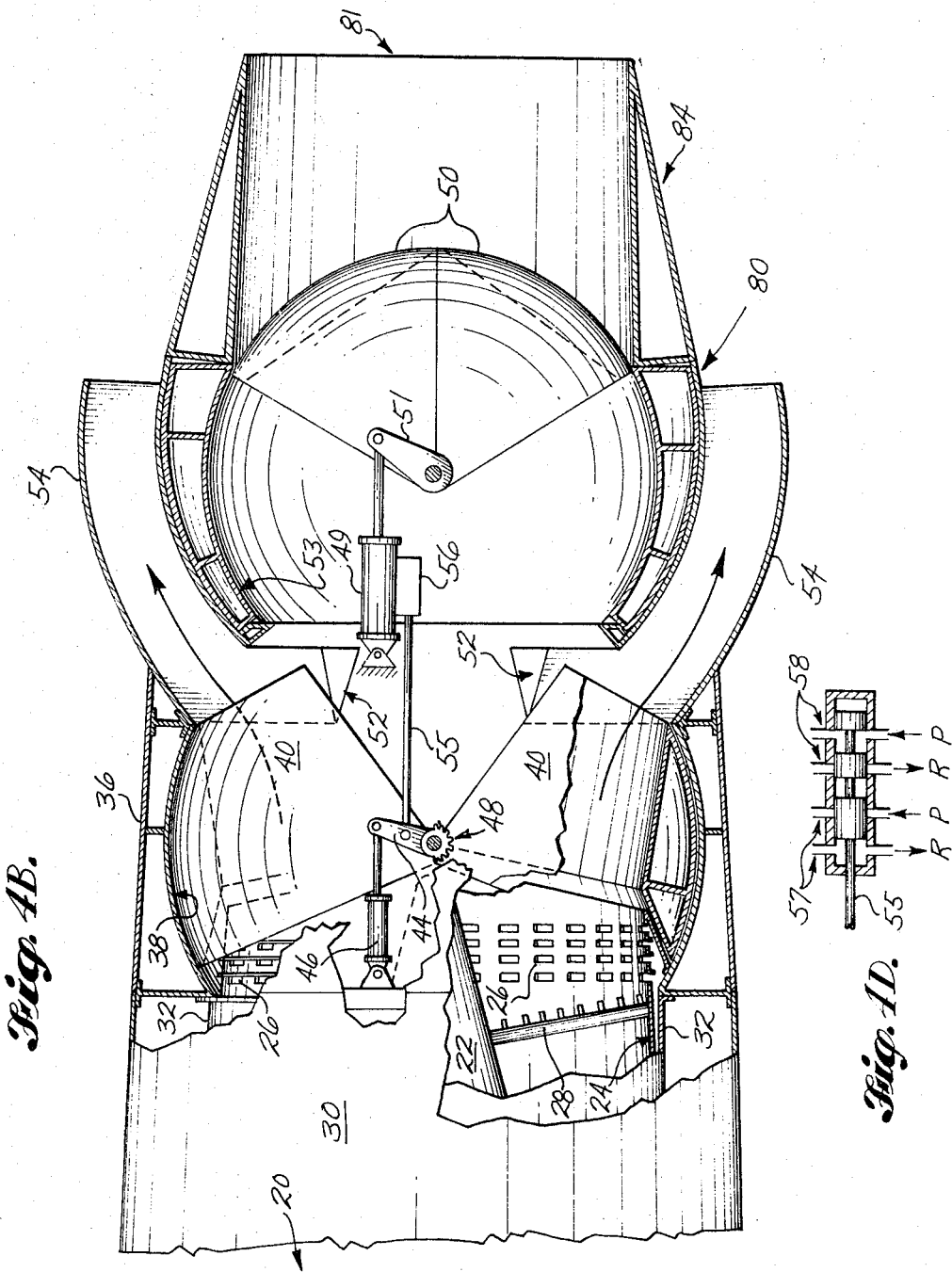

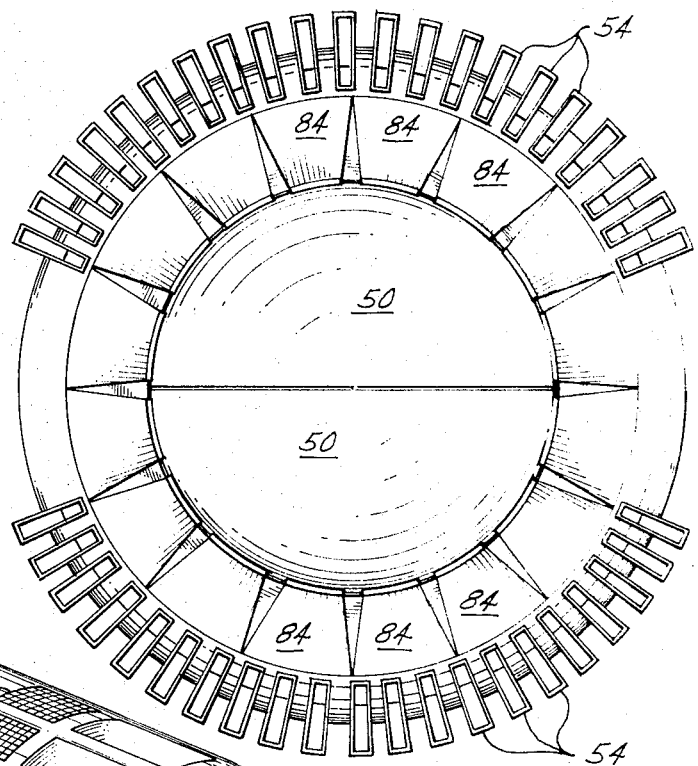
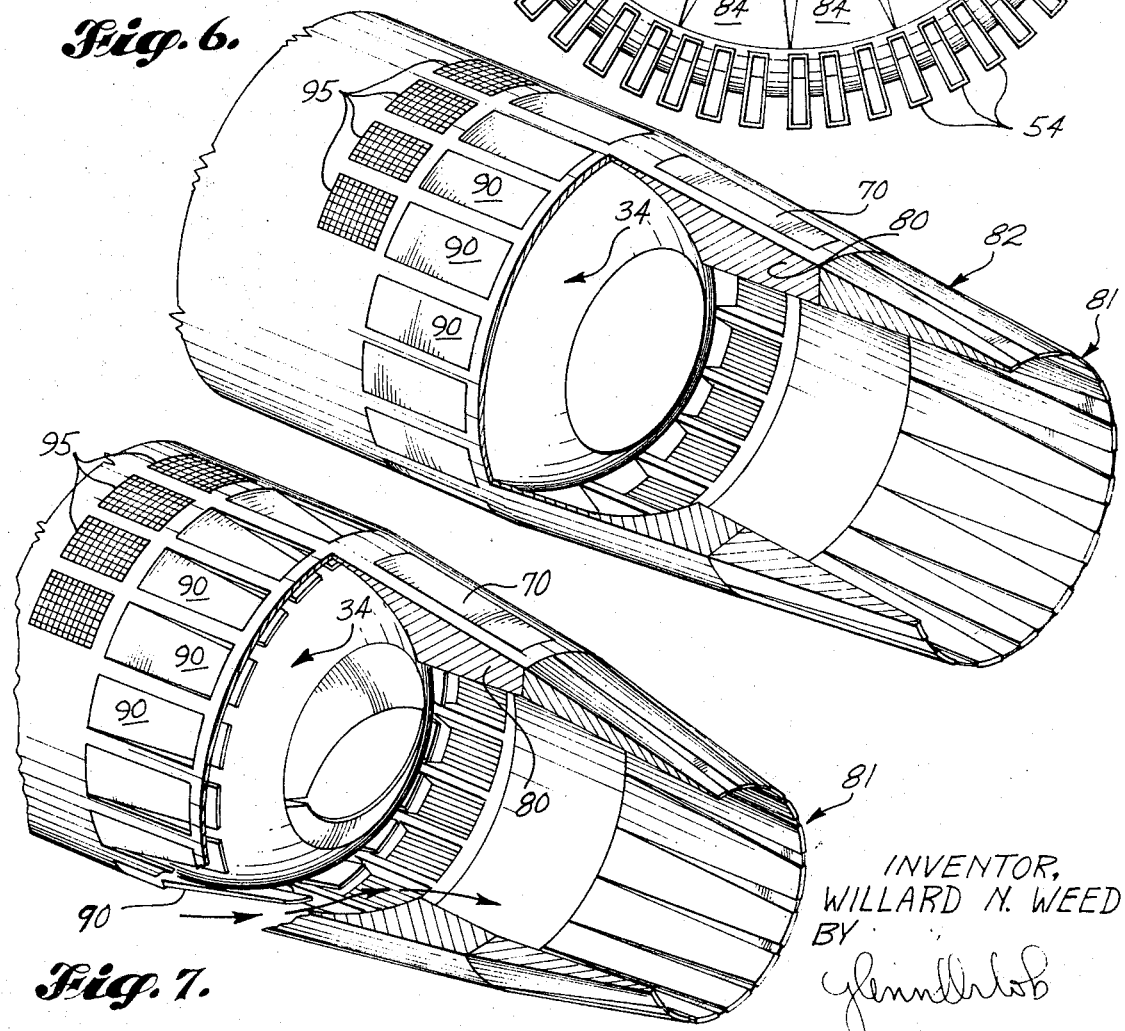

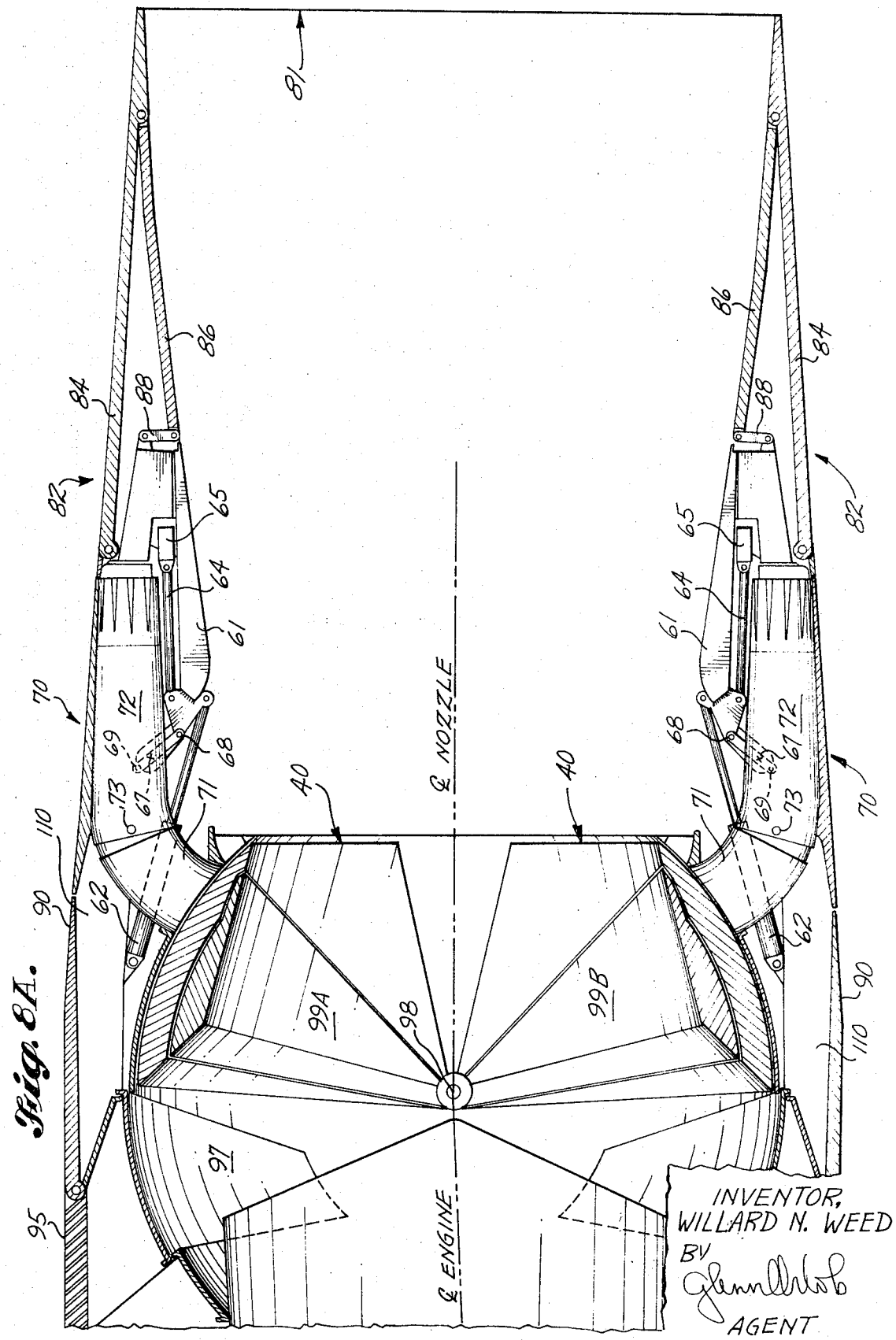

INVENTOR,
WILLARD N. WEED

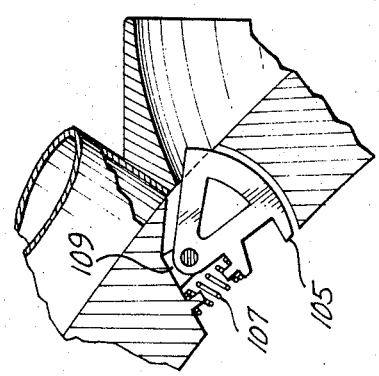
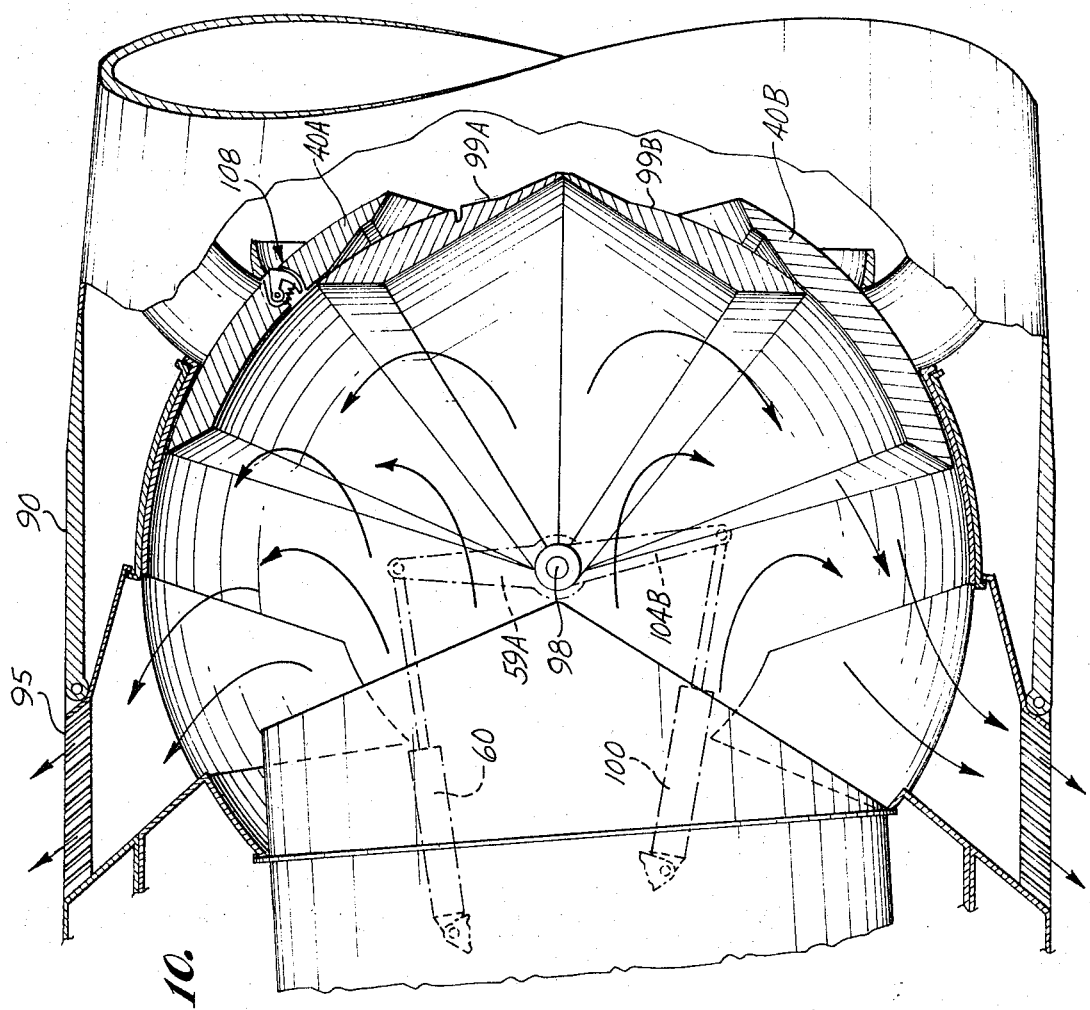

INVENTOR.
WILLARD N. WEED

JET ENGINE EXHAUST NOZZLE SYSTEM

SUMMARY OF THE INVENTION

The invention relates to a variable area nozzle for jet engine exhaust control and more particularly to a variable area primary nozzle for producing efficient jet engine propulsion by maintaining the engine exhaust exit velocity approximately Mach 1.0 and also during certain power phases, as a nozzle noise suppression device.

During certain decreased engine power phases such as in the flight descent of a jet engined airplane, when a low engine power setting is utilized, the opening up of the primary exhaust nozzle exit from that of the normal optimum design exit area (i.e., maintaining approximately Mach 1 engine exit primary exhaust velocity at cruise power condition) would produce a sound suppression mode by over expansion of the exhaust gases.

Also, in the afterburning type of turbojet engine, the actuation of the variable area primary nozzle provides for an efficient exhaust exit area choke plane to maintain approximately Mach 1.0 exhaust exit velocity during either the augmented or the non-augmented engine operating condition.

In the augmented or afterburning mode, as additional fuel is injected into the afterburner combustion chamber, the temperature of the fluid stream flow is substantially increased above that without afterburner, and, as a result, the gaseous volume of the fluid stream flow is increased. In order to take care of this expansion and maintain fluid stream exit velocity at Mach 1.0 the nozzle exit area is increased. From the standpoint of efficient engine operation, it is desirous that a fluid stream velocity of Mach 1.0 exit from the primary exhaust nozzle. Normally the optimum design point for the primary nozzle is to size the exit area so as to maintain approximately Mach 1.0 engine exhaust velocity at the ideal or cruise power condition. Theoretically, the ideal nozzle for a jet engine is designed so that the fluid stream flow at the exit plane is Mach 1.0 since it is the basic theory that the greatest efficiency of the jet engine is realized when the velocity is Mach 1.0 or the highest velocity that you can attain without going supersonic.

For a supersonic airplane, a secondary nozzle is necessary in order to control the flow aft of the primary nozzle Mach 1.0 exit plane to obtain the desired Mach number at the secondary nozzle exit, e.g., for a Mach 2.7 airplane, approximately Mach 2.7 flow at the secondary exit plane is desired. Generally, in supersonic airplanes, the terminus exhaust velocity is slightly above that of free stream velocity.

Further, the invention relates to an exhaust nozzle system for turbojet afterburning engines wherein a two-stage variable area ejection nozzle is utilized comprising: a variable area first stage or primary nozzle having a circular or spherical shell housing containing two or more pivotally mounted circular or spherical segments which are rotatably adjusted within the internal periphery of the housing in response to augmented and non-augmented engine operational requirements in order to provide an efficient variable nozzle exit area choke plane for maintaining approximately Mach 1.0 engine exhaust exit velocity; and a second stage or secondary nozzle equipped with circumferentially spaced blow-in-doors and aerodynamically actuated trailing edge flaps which vary the secondary nozzle both to control the exit velocity at slightly above the free stream velocity in supersonic flight and in response to primary nozzle adjustments.

Also, included within the exhaust nozzle system is the combination of a retractable spoke and tube sound suppression system and a thrust reverser system.

The configuration of the variable area primary nozzle of a three-dimensional or annular exhaust system is similar to that of a hemispherical shell having a central opening wherein two or more spherical segments are pivotally mounted within the hemispherical shell and rotatably adjusted to vary the central opening so as to provide a variable exhaust exit area choke plane for the jet engine exhaust gases.

One of the advantages of the present invention over prior known variable nozzles utilizing spherical sections, usually clamshell types, is the internal shaping and the aft trim. As trimmed, the spherical segments provide a nozzle choke plane essentially normal to the gas flow and internal shaping provides an efficient conical nozzle throughout the range of variation.

Another advantage of the spherical shell and its nozzle segments is its ability to react to the increased pressure loads due to afterburning directly through efficient hoop tension load paths since the afterburner combustion chamber is housed within the spherical shell. The hoop tension load path in the spherical nozzle shell is explained in greater detail in engineering stress handbooks on pressure vessel design such as the publication "Formulas for Stress and Strain" by Raymond J. Roark, published by the McGraw-Hill Book Company (1954). When a spherical nozzle shell or a pressure vessel that is a figure of revolution is subjected to an internal pressure, the stresses that are set up in the relatively thin walls i.e., where the wall thickness is less than one-tenth of the radius, is a primary importance and the hoop stress or tension is defined as that force that acts parallel to the circumference. Because of the symmetry of the walls about the axis of the figure of revolution, the hoop tension is practically uniform throughout the thickness of the wall and there will be no tendency for the structure to depart from its circular or spherical form.

Another advantage is that nozzle performance losses due to seal leakage is minimized since no moving seals are required between the spherical shell of the primary nozzle and its moveable segments.

A further advantage of the invention is that the variable area nozzle can be used as a valve for diverting all or part of the engine exhaust flow in a peripheral direction instead of directly aft. This feature is of potential value where flow separation is desired for use in conjunction with engine noise suppression devices.

These, as well as other advantages of the invention, will be more clearly understood from the following description when read with reference to the accompanying drawings wherein:

FIG. 4A is a left-hand side view of a second embodiment of the invention comprising the variable area primary nozzle in combination with a secondary nozzle and further including sound suppression elements depicting their position in the non-suppression mode;

FIG. 4B is similar to FIG. 4A depicting the position of the primary and secondary nozzle elements when in the noise suppression mode;

FIGS. 4C and 4D are schematic diagrams of the operating positions of control valve 56 representing the stowed and deployed positions of the clamshell blocker doors 50 shown in FIGS. 4A and 4B respectively;

FIG. 5 is a rear view of FIG. 4B;

FIG. 6 is an isometric view from a rearward aspect above the engine exhaust nozzle section of a third embodiment of the invention comprising the variable area primary nozzle in combination with a secondary nozzle and further including the fully augmented afterburning engine operation, sound suppression, and thrust reversing;

FIG. 7 is an isometric view similar to FIG. 6 with the engine in the non-augmented or afterburner off configuration;

FIG. 8A is a left-hand side view of the third embodiment shown in FIGS. 6 and 7 with the nozzle system in the non-suppression mode;

FIG. 10 is a left-hand side view similar to FIGS. 8A and 8B of the thrust reversing mechanism incorporated within the primary nozzle structure;

FIG. 12 is an enlarged detail of the interlock mechanism between the variable primary nozzle spherical segments and the reverser clamshell segments;

Figure 1:
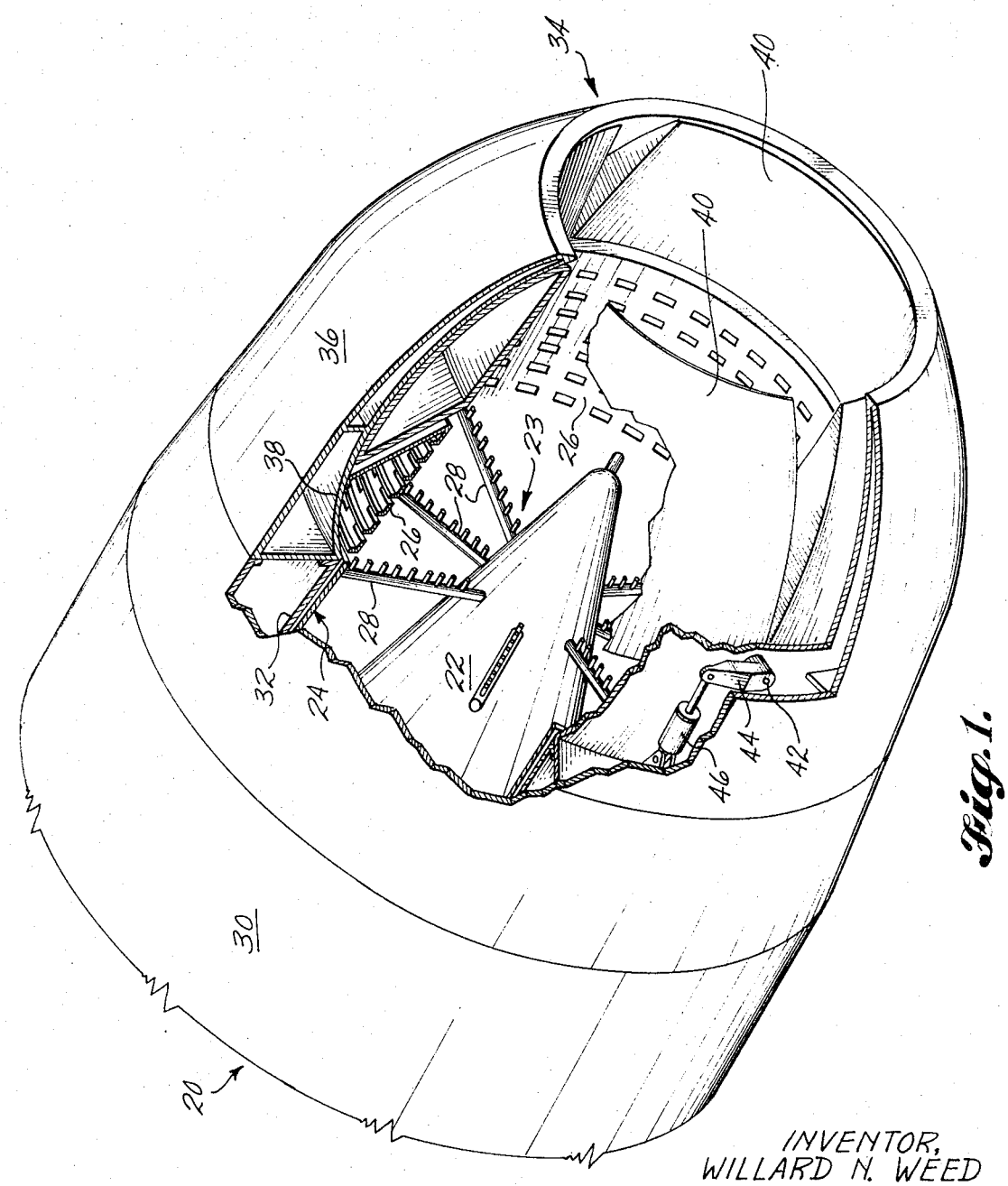
FIG. 1 is an isometric view from a rearward aspect of a three-dimensional or annular engine exhaust nozzle section incorporating one form of the invention comprising the variable area primary nozzle in combination with afterburning.
Figure 2A:
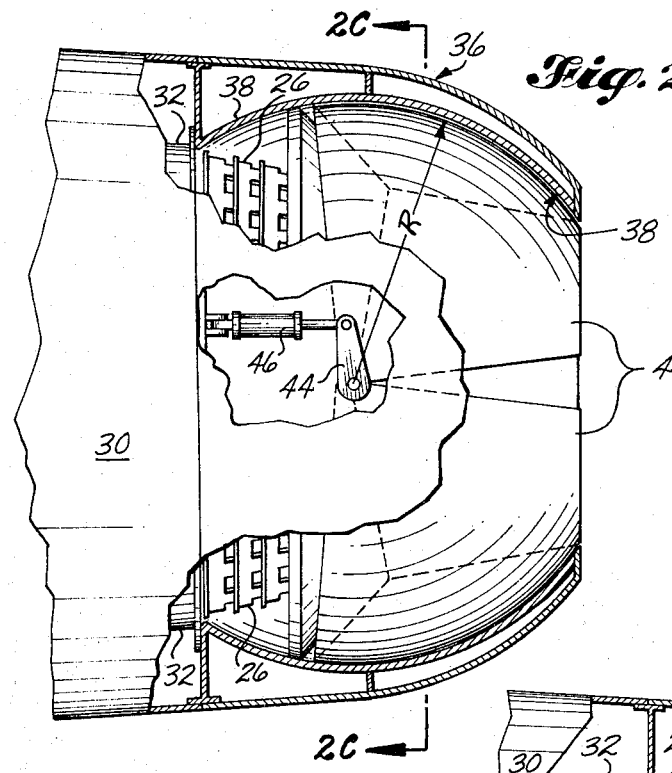
FIG. 2A is a left-hand side view similar to FIG. 1 depicting the position of the primary nozzle in the open or augmented mode position.
Figure 2C:
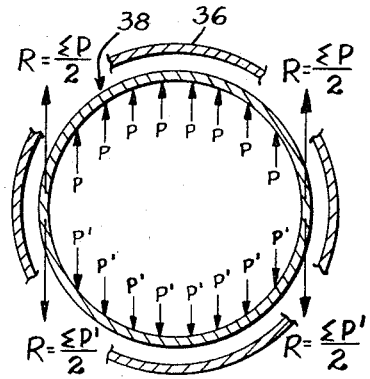
FIG. 2C is a cross-sectional end view on a smaller scale of the spherical nozzle shell taken along the line 2C—2C indicated in FIG. 2A and is a schematic load diagram that illustrates how the internal radial pressure loads are distributed around the inner periphery and transferred into a closed loop load path of hoop tension.
Figure 2B:
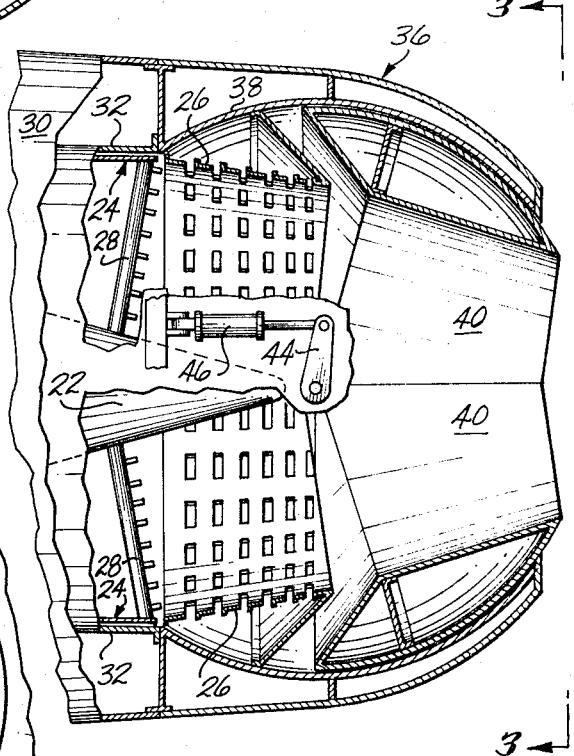
FIG. 2B is similar to FIG. 2A depicting the primary nozzle in the non-augmented mode position.
Figure 3:
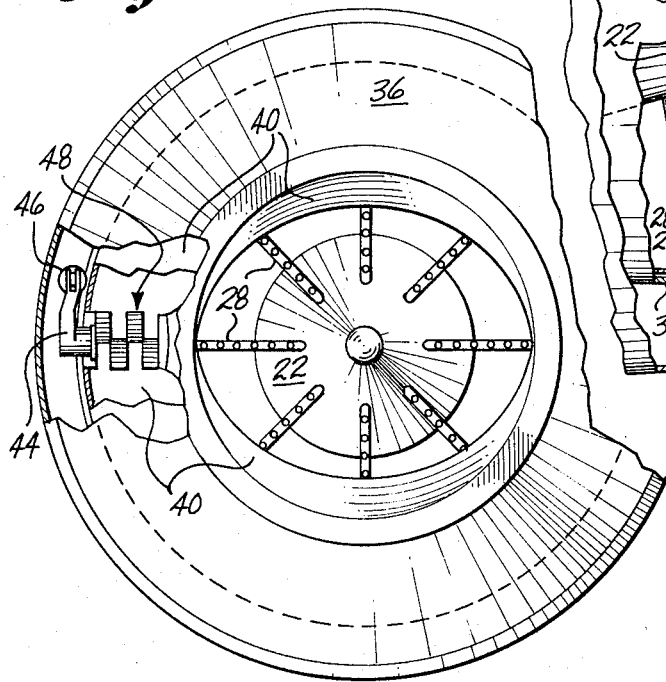
FIG. 3 is a rear view of FIG. 2B.

Referring to FIGS. 1–3, inclusive, a generally depicted jet engine 20, having an internal tail cone section 22, an afterburner or thrust augmentation section 23 with liner 24 terminating in a vented augmentor liner section 26. The additional fuel for the thrust augmentation mode is injected into the afterburner combustion chamber 23 through spoke fuel nozzles 28 positioned between the internal tail cone section 22 and the inner periphery of the liner 24. The jet engine 20 has an outer engine cowling 30 and an inner cylindrical section 32 flanged at its terminus for attachment to the variable area primary nozzle section 34. The variable area primary nozzle section comprises a housing 36 having an inner spherical shell 38 and two or more internal segments 40 pivotally mounted at 42 to the housing 36 for rotation within the housing. Actuator 46 moves crank arm 44 and rotates the segments 40 through gearing 48 in opposite directions so as to vary the nozzle opening.

The inner spherical shell 38 and the internal segments 40 may deviate from spherical and may be spheroidal in shape but in general they remain surfaces of revolution around a common axis. Also, the inside gas flow control surfaces of the internal segments 40 should be frusto-conical to provide a smooth and efficient area contraction to the exhaust nozzle choke plane.

The operation, when force is applied by the actuator 46 to the segment rotation crank 44, the internal segments 40 rotate together and as they close to the position shown in FIGS. 2B and 3, the area at the primary nozzle exit plane is decreased to provide the required area for efficient non-augmented engine operation. When actuator force is applied in the opposite direction, the segments rotate to the position shown in FIGS. 1 and 2A which provides increased nozzle exit area for efficient augmented engine operation. Positions may be selected between the extremes of motion if partial augmentation is desired.

Also, during certain decreased engine power settings such as during a landing approach, sound suppression may be induced through over expansion of the exhaust gases by opening up of the primary exhaust nozzle exit.

A second embodiment of the invention is shown in FIGS. 4 to 5, inclusive, wherein the variable area primary nozzle is utilized as a spherical valve and directional flow control device for diverting all or part of the engine exhaust flow in an outward peripheral direction for use in conjunction with engine noise suppression devices. The clamshell blocker doors 50 are rotated out from an inner spherical shell 53 of the inner wall surface of the supersonic secondary nozzle envelope 80 to a position where they block the normal aft flow of the exhaust gases through the secondary nozzle exit plane 81. At the same time, the primary nozzle internal segments 40 are driven rotatably forward to uncover an annular opening 52 exit path through which the exhaust gases are directed to a multitude of small vane nozzles 54 for providing flow separation and resulting noise level reduction. The internal nozzle segments 40 are rotated by actuator 46 through crank arm 44. Control rod 55 connects crank 44 and control valve 56 and positions the valve to direct fluid flow to the correct side of actuator 49 for positioning of the clamshell blocker doors 50 relative to internal segment 40 position. FIGS. 4C and 4D are schematic diagrams of the operation of control valve 56 depicting the positions of the valve to match the clamshell blocker doors 50 stowed and deployed positions respectively. FIG. 4C is representative of the stowed position of the blocker doors as shown in FIG. 4A with pressure and return lines 57 ported to the blocker doors stowed side of actuator 49, and with pressure and return lines 58 ported to the blocker doors deployed side of the actuator 49. FIG. 4D is representative of the deployed position of the blocker doors 50 as shown in FIG. 4B.

FIGS. 6 through 14 show a third embodiment of the invention depicting the complete engine exhaust system utilizing the variable area primary nozzle previously described and a two-stage ejector secondary nozzle that utilizes blow-in-doors 90 and an aerodynamically actuated trailing edge flap assembly 82 and further including modifications to accommodate a sound suppressor system and a thrust reverser system.

Figure 8B:
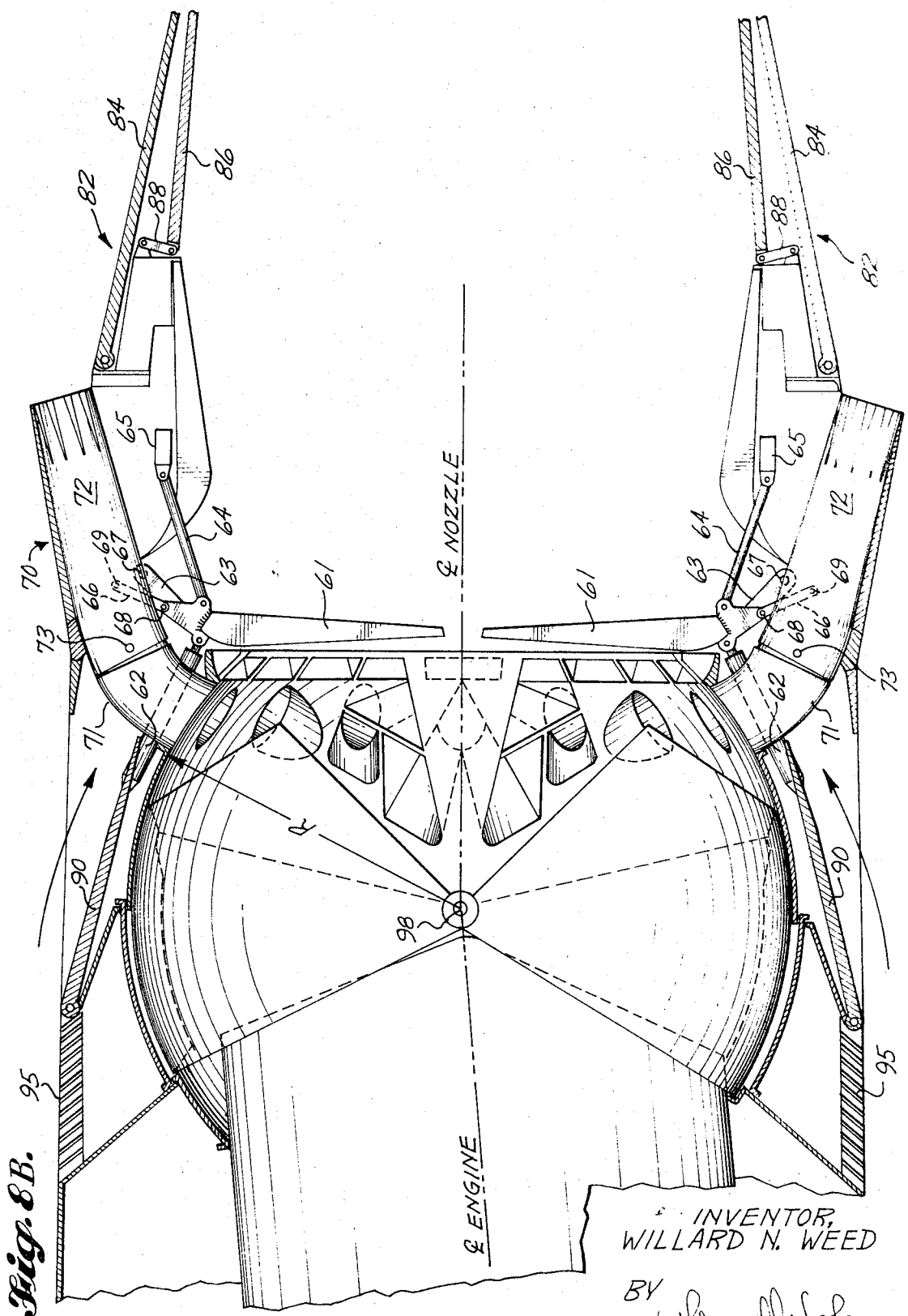
FIG. 8B is similar to FIG. 8A with the nozzle system in the noise suppression mode.
Figure 9A:
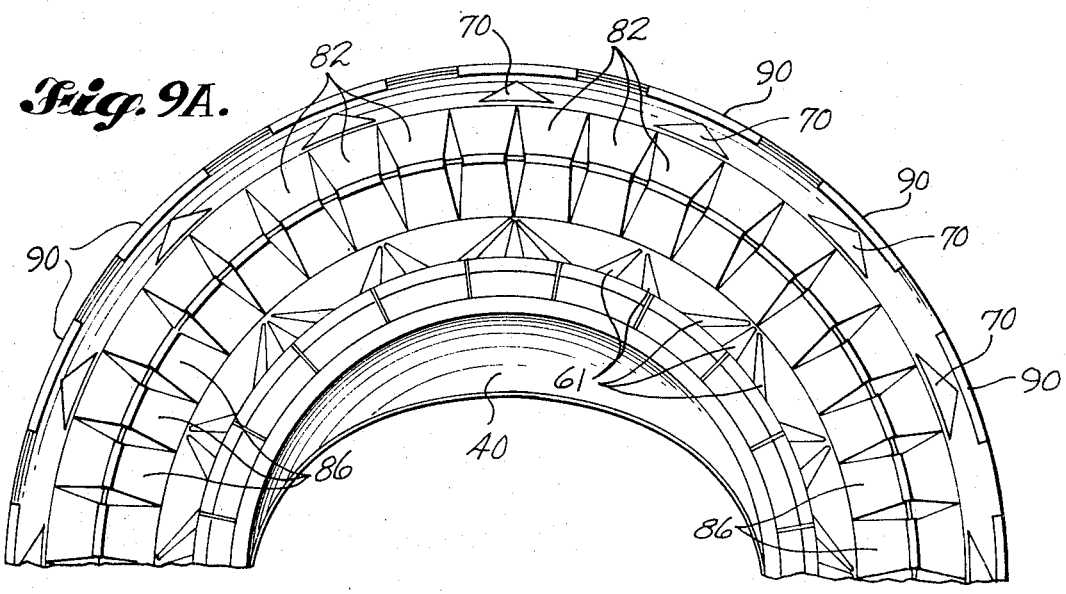
FIG. 9A is a rear view of FIG. 8A.
Figure 9B:
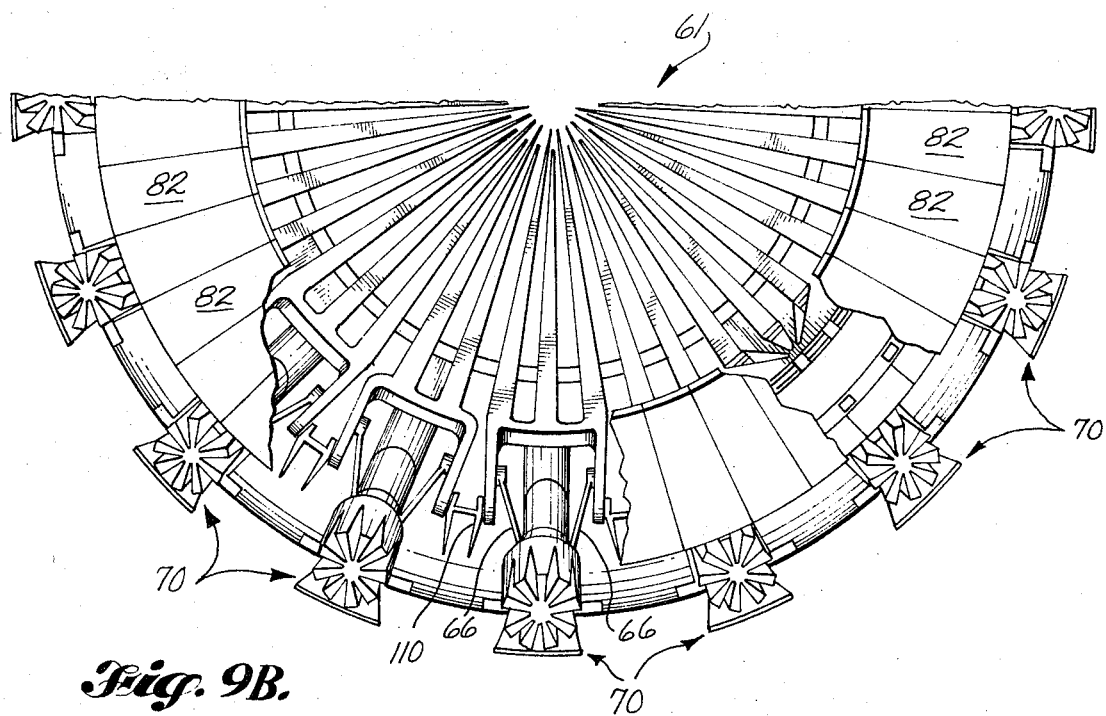
FIG. 9B is a rear view of FIG. 8B.

FIGS. 8A, 8B, 9A and 9B show the operating mechanism for the spoke and tube combination sound suppression system in greater detail. The general arrangement of the complete engine exhaust nozzle system and the positioning of the elements when in the cruise mode operating condition is depicted in FIGS. 8A and 9A which show the retractable tube assembly 70 and spokes 61 stowed in the secondary nozzle wall when not in use. When the exhaust nozzle system is actuated from the cruise mode condition shown in FIGS. 8A and 9A, to the sound suppression mode, the general arrangement of the complete engine nozzle system and the position of the elements is as shown in FIGS. 8B and 9B.

The sound suppression mode is achieved by utilizing retractable sound suppression spokes 61 which extend radially inward from the secondary nozzle wall into the exit flow from the primary nozzle to break up the engine exhaust gas flow and, in addition, retractable sound suppression tubes 72 equipped with a segmented vane nozzle or Greatrex ends direct part of the engine exhaust gases from within the primary nozzle section to an outward peripheral direction into the atmosphere. The openings to the fixed suppression tube sections 71 at their attachment to the primary nozzle are uncovered by forwardly rotating the internal segment 40 of the variable primary nozzle. The flow area between the extended spokes 61 plus the exit area of the Greatrex ended tubes 72 is sized to provide the desired choke area for engine match. Further, the inclusion of the blow-in-doors 90 ventilates the base area of the spokes 61 extended into the flow area and thereby reduces base drag of the spokes. As shown, the sound suppression system comprises actuators 62 which through the interconnection of some of the clusters of suppression spokes 61 and a link 64, drive the unison ring 65. The remaining clusters of suppression spokes 61 are slaved to the unison ring 65 via additional drive links 64. The clusters, as shown in FIG. 9B, consist of either two or three spokes that are arranged alternately around the nozzle. The retractable suppression tubes 72 with Greatrex ends are slaved to the suppression spoke clusters through crank arm 63 and slave link 66 and are deployed outwardly by the same actuation system. The linkage 66 that slaves the tubes to the spoke clusters is designed to go over center in the stowed position. The overcenter feature is depicted by referral to pivot points 67, 68 and 69 in FIGS. 8A and 8B. The centerline between pivot points 68 and 69 crosses over pivot point 67 when the linkage moves the suppression tubes from the suppression mode shown in FIG. 8B to the stowed position shown in FIG. 8A. This provides a suppression system lock in the stowed position. The Greatrex ended tubes 72 connect to the primary nozzle housing 36 through a ball joint 73 and a stationary tube 71. Support beams 110 are provided between suppression tubes 70 and continue aft to support the trailing edge flap assembly 82.

The trailing edge flap assembly 82 consists of a series of overlapping outer flaps 84, inner flaps 86 and pivot links 88. The flaps open and close as the difference between internal and external pressure changes. If external pressures become higher than internal pressures, external flap 84 and internal flap 86 will rotate inward and reduce the diameter of the secondary nozzle exit plane 81. If internal pressures become higher than external pressures, the motion is reversed. Aerodynamic pressures vary such that the trailing edge flaps move in the direction necessary for proper secondary nozzle area match with the engine and the primary nozzle. Blow-in doors 90 also respond to pressure variation to provide aerodynamic filling of internal irregularities.

Figure 14:
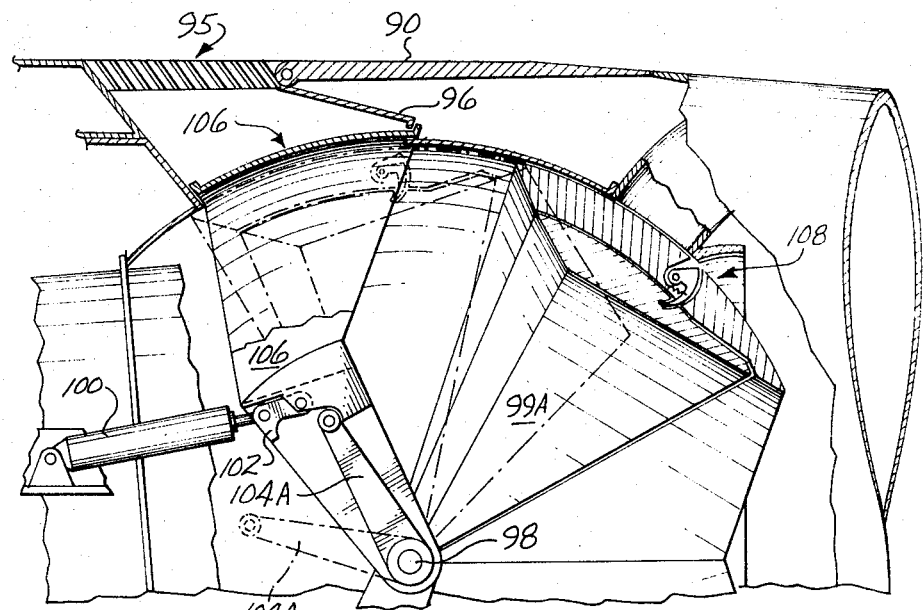
FIG. 14 is similar to FIG. 13 with the reverser cover and linkage in the non-thrust reverser mode.

FIGS. 10 through 14 show in greater detail the operating mechanism for the thrust reverser system of the third embodiment of the invention. The thrust reversing mode is achieved by utilizing two separate clamshell type blocker doors 99A and 99B which are pivotally mounted at 98 to rotate within the adjustable primary nozzle segments 40A and 40B respectively. The blocker doors and nozzle segments are actuated to the position shown in FIGS. 10, 11 and 13, by reverser actuators 100 connected to rotating dog links 102 which are pivotally attached to reverser cover 106. The dog links 102 also rotatably interlock the reverser crank arms 104A and 104B to move them to the shown thrust reversing mode. In FIG. 14, the dog link 102 rotatably disconnects the thrust reversing crank arm 104A to allow further movement of the combined interlocked segments 99A and 40A of the primary nozzle to allow normal operation of the primary nozzle to further positioning when not operating in the reverse thrust regime. An interlock 108 is provided between the clamshell blocker doors 99A and 99B and the external segments of the primary nozzle 40A and 40B so that they will move together, except when reverse thrust is desired. The interlock mechanism is shown in detail in FIG. 12 and consists of a latch 105, pivotally connected to a support bracket 109 and spring biased by a compression spring 107 to an outward unlatched pivotal position on primary nozzle external segments 40A and 40B. When the external segments 40A, 40B and internal segments 99A, 99B of the primary nozzle are combined and the primary nozzle is in its closed, non-augmented position as shown in FIG. 14, the compression spring 107 rotates the latch 105 outward into an opening in the primary nozzle shell 38 and disconnects the primary nozzle external segments 40A and 40B from the reverser clamshell blocker doors or internal segments 99A and 99B. The clamshell blocker doors 99A and 99B are then free to rotate further, with respect to segments 40A and 40B, to their reverse thrust position shown in FIGS. 10, 11 and 13.

Figure 11:
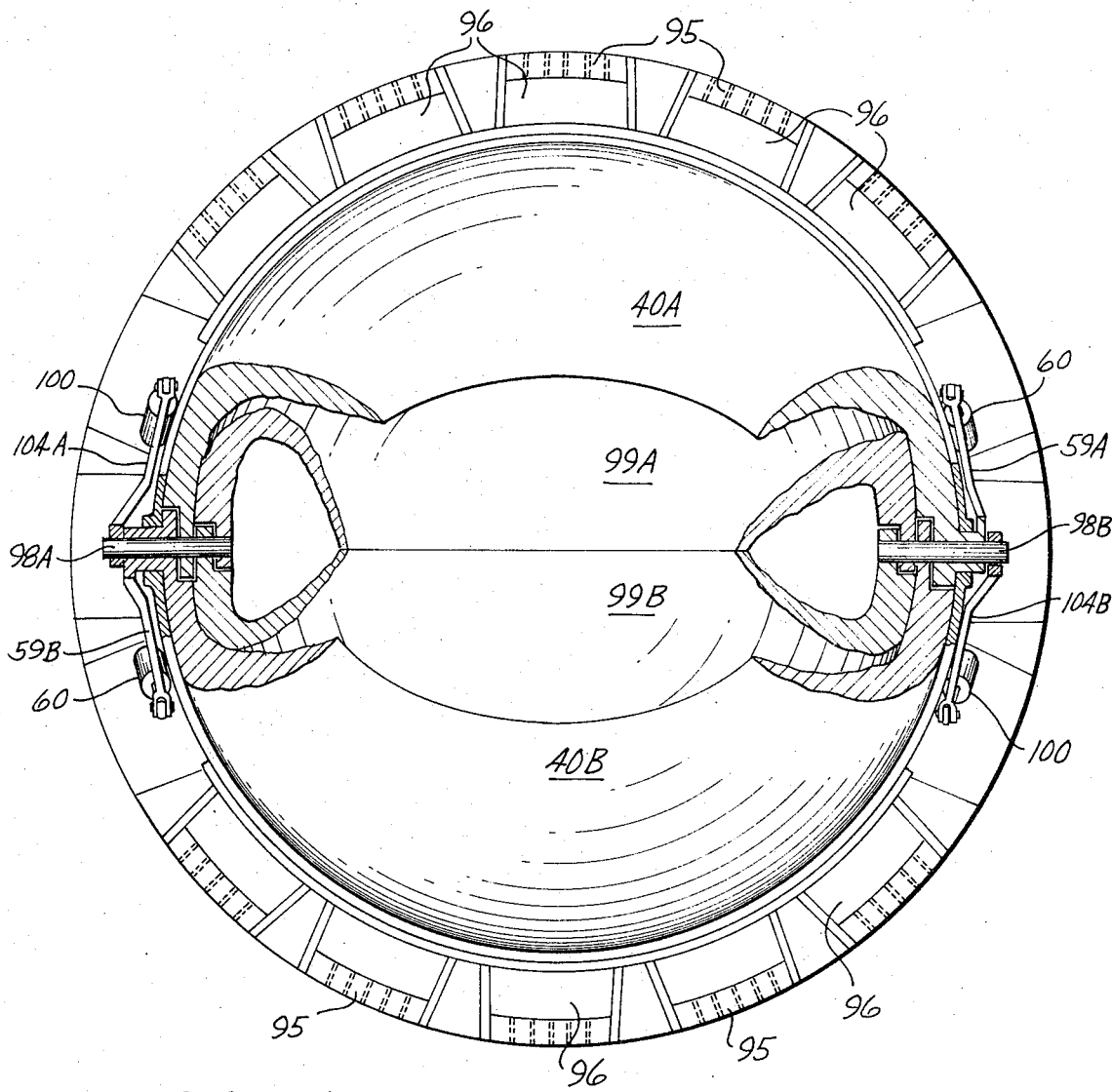
FIG. 11 is a rear view of FIG. 10.
Figure 13:
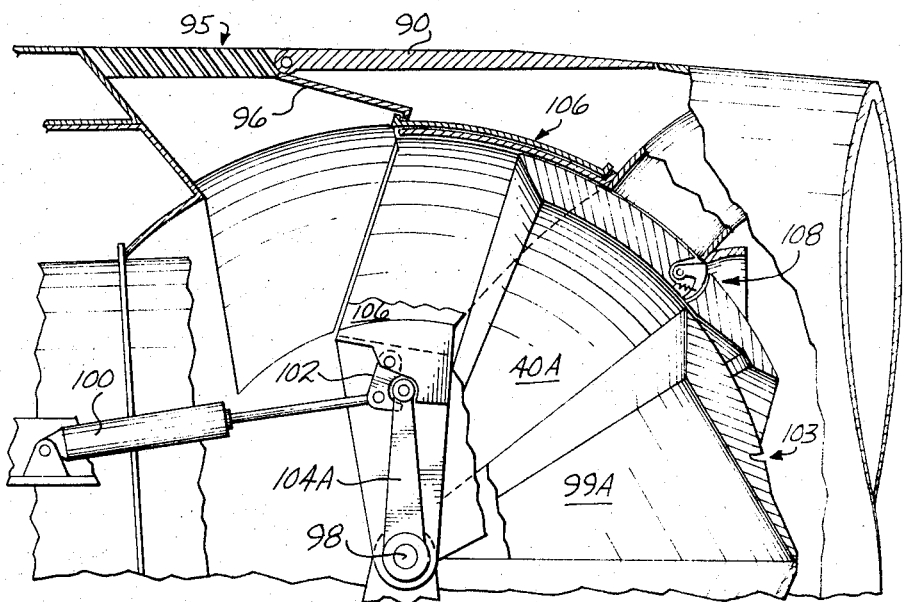
FIG. 13 is a left-hand side view similar to FIG. 10 with the additional detail of the thrust reverser cover and actuating mechanism in the thrust reverser mode exposing the reverser cascades.

In FIG. 11, the reverser crank arm 104A is rigidly connected to the shaft of pivotal connection 98A which is in turn rigidly connected to one end of blocker door 99A. The other end of blocker door 99A is freely mounted on the shaft of pivotal connection 98B. The other reverser crank arm 104B, on the opposite side, is rigidly connected to the shaft of pivotal connection 98B which is in turn rigidly connected to one end of blocker door 99B. The other end of blocker door 99B is freely mounted on the shaft of pivotal connection 99A. Therefore, movement of reverser crank arms 104A and 104B will rotate the internal segments 99A and 99B respectively of the primary nozzle. The primary nozzle external segment crank arm 59A is rigidly connected to a collar freely mounted on the shaft of pivotal connection 98B which collar is in turn rigidly connected to one end of nozzle segment 40A. The other end of nozzle segment 40A is freely mounted on the shaft of pivotal connection 98A. Crank arm 59B is rigidly connected to a collar freely mounted on the shaft of pivotal connection 98A which collar is in turn rigidly connected to one end of nozzle segment 40B. The other end of nozzle segment 40B is freely mounted on the shaft of pivotal connection 98B. Therefore, movement of the primary nozzle crank arms 59A and 59B will rotate the external segments 40A and 40B, respectively, of the primary nozzle.

When the reverser clamshell blocker doors 99A and 99B are stowed as shown in FIG. 14, and the variable primary nozzle external segments 40A and 40B start to open for augmented operation, the latch 105 shown in FIG. 12 is forced to rotate against spring 107 by contact with primary nozzle shell 38 and engages a locking slot 103 in the reverser clamshell blocker doors 99A and 99B thereby locking them to the variable primary nozzle external segments 40A and 40B, respectively, and moving with them throughout their range travel.

Included in the thrust reverser system with the clamshell blocker doors 99A and 99B are reverser covers 106, the reverse flow shrouds 96 and the reverser cascades 95. The reverser covers 106 are freely mounted on the shafts of pivotal connections 98A and 98B, and are actuated through rotating dog link 102 by the reverser crank arm actuators 100. The openings in the primary nozzle shell 38 that are uncovered when the reverser covers are actuated by the linkage mechanism rotating the clamshell blocker doors 99A and 99B from the inner surface of the external nozzle segments 40A and 40B to block the forward thrust flow, allow the exhaust gas flow through the reverse flow shrouds 96 to final reverse gas directional control by the reverser cascades 95.

Although the thrust reversing mechanism depicted in FIGS. 10 through 14 is shown in combination with the third embodiment of the invention, i.e., in combination with a supersonic nozzle and sound suppressor, it will be understood that the thrust reverser system would be equally adaptable to an exhaust nozzle system without sound suppression or afterburning.

While the invention has been disclosed with reference to presently preferred embodiments, it is to be understood that these modifications and changes which become obvious to a person skilled in the art as a result of the teachings hereof will be encompassed by the following claims:

What is claimed is:

1. A variable area nozzle for jet engine exhaust gases comprising, a primary nozzle having a spherical nozzle shell and being of a continuous and integral inner surface structure for directly reacting to internal pressure loads through its shell wall in a closed loop load path of hoop tension, two spherical segments having a conical inner surface and a spherical outer surface complementary to the inner surface of said shell, said segments being pivotally mounted within said shell and rotatably adjustable to vary the position of the conical inner surface for providing a smooth area reduction to a variable exit area nozzle choke plane.

2. The variable area nozzle set forth in claim 1, further including an afterburner section upstream of the pivotal spherical segments and actuator means for rotatably positioning said spherical segments to increase the nozzle exit area when in the thrust augmentation mode.

3. The structure set forth in claim 2, wherein said afterburner section has its combustion chamber housed within said spherical nozzle shell such that the spherical nozzle shell reacts to the augmented pressure loads directly through hoop tension load paths in the shell wall.

4. A variable area two-stage ejection nozzle system for jet engine exhaust gases comprising; a primary nozzle having a spherical nozzle shell of a continuous and integral inner surface structure for directly reacting to internal pressure loads through its shell wall in a closed loop loadpath of hoop tension, two pivotal spherical segments having a spherical outer surface complementary to the inner surface of said shell and rotatably adjustable within the shell, said spherical segments having an internal conical shaping for providing a smooth area reduction to a variable exit area nozzle choke plane; a secondary nozzle downstream of said primary nozzle and having blow-in doors and aerodynamically actuated pivotable trailing edge flaps for varying the secondary nozzle exit area in response to pressure variations created by primary nozzle adjustments.

5. The variable area nozzle set forth in claim 4, further including an afterburner section upstream of the pivotal spherical segments and actuator means for rotatably positioning said spherical segments to increase the nozzle exit area when in the thrust augmentation mode.

6. The structure set forth in claim 5, wherein said afterburner section has its combustion chamber housed within said spherical nozzle shell such that the spherical nozzle shell reacts to the augmented pressure loads directly through hoop tension load paths in the shell wall.

7. A variable area ejection nozzle system for turbojet afterburning engines comprising in combination: a primary nozzle having a spherical nozzle shell of a continuous and integral inner surface structure for directly reacting to internal pressure loads through its shell wall in a closed loop load path of hoop tension; two spherical segments having a conical inner surface and a spherical outer surface sized to conform to the internal surface contour of said shell, said segments being mounted for pivotal rotation within the shell; and actuator means for rotating said spherical segments to an abutment position to provide a continuous axially extending conical inner surface, thereby providing a smooth internal cross-section area reduction for the turbo-jet exhaust gases to the primary nozzle exit.

8. The ejection nozzle system set forth in claim 7, further including a secondary nozzle downstream of said primary nozzle and having circumferentially spaced blow-in doors and trailing edge flaps pivotally mounted and aerodynamically actuated for varying the secondary nozzle exit area in response to pressure variations created by primary nozzle adjustments.

9. The ejection nozzle system set forth in claim 8, further including an afterburner section upstream of the pivotally mounted spherical segments wherein its combustion chamber is housed within said spherical nozzle shell such that the spherical nozzle shell reacts to the augmented pressure loads directly through hoop tension load paths in the shell wall.

10. A variable area nozzle and thrust reverser for jet engine exhaust gases comprising: a structurally rigid spherical nozzle shell having a continuous and integral inner surface for directly reacting to internal pressure loads through its shell wall in a closed loop load path of hoop tension; two spherical segments having a spherical inner surface and a spherical outer surface sized to conform to the internal surface contour of said shell, said segments being pivotally mounted to said shell and rotatably adjustable within said shell; clam shell blocker doors having a conical inner surface and a spherical outer surface sized to conform to the internal surface contour of said segments, said doors being concentrically incorporated within said pivotal spherical segments and pivotally mounted therewith for rotatable adjustment with respect thereto for blocking the flow through the variable area nozzle to provide for reverse thrust control and for rotatable adjustment in unison therewith for varying the position of the conical inner surface to provide an internal cross-section area reduction for the jet engine exhaust gases when not in the thrust reversal operating position.

11. The variable area nozzle and thrust reverser set forth in claim 10, further including a flow reverser opening in said spherical nozzle shell to provide reverse gas directional control, and reverser cascades positioned in said opening for receiving gas flow and directing it forwardly for thrust reversal.

12. The variable area nozzle and thrust reverser set forth in claim 10, further including an interlock mechanism between the clam shell blocker doors and the said spherical segments to provide for their moving together except when the blocker doors are actuated to the reverse thrust position.

13. The variable area nozzle and thrust reverser set forth in claim 11, further including a reverser cover for uncovering said opening in said spherical nozzle shell when said clam shell blocker doors are rotated to block the forward thrust flow through said variable area nozzle.

14. A variable area nozzle and thrust reverser for jet engine exhaust gases comprising: a structurally rigid spherical nozzle shell having a continuous and integral inner surface for directly reacting to internal pressure loads through its shell wall in a closed loop load path of hoop tension; two spherical segments having a spherical inner surface and a spherical outer surface sized to conform to the internal surface contour of said shell, said segments being pivotally mounted to said shell and rotatably adjustable within said shell; clam shell blocker doors having a conical inner surface and a spherical outer surface sized to conform to the internal surface contour of said segments, said doors being concentrically incorporated within said pivotal spherical segments and pivotally mounted therewith for rotatable adjustment with respect thereto; actuator means for pivoting the spherical segments between a first and second position for a range of exit area variation in the non-thrust reversing mode and between a second and third position wherein the clam shell blocker doors are rotated with respect to said pivotal spherical segments to block the axial flow of exhaust gases through the variable area nozzle to provide for reverse thrust control.

15. The variable area nozzle and thrust reverser set forth in claim 14, further including a flow reverser opening in said spherical nozzle shell to provide for reverse gas flow from the spherical nozzle shell when the clam shell blocker doors are rotated with respect to the pivotal spherical segments from the second to the third position by said actuator means to block the forward thrust flow through the variable area nozzle.

16. The variable area nozzle and thrust reverser set forth in claim 15, further including a reverser cover for uncovering said opening in said spherical nozzle shell when the clam shell blocker doors are rotated from their second to their third position by the actuator means.

17. The variable area nozzle and thrust reverser set forth in claim 16, further including locking means for rotatably interlocking the spherical segments incorporating the blocker doors with the reverser cover when the spherical segments including the blocker doors are rotated by the actuator means from their first position to their second position whereby the opening in the nozzle shell is uncovered when the blocker doors are rotated with respect to the spherical segments by the actuator means for blocking the axial flow of exhaust gases as they are moved from their second position to their third thrust reversing mode position.

18. A variable area nozzle and noise suppressor for jet engine exhaust gases comprising: a primary nozzle having a spherical nozzle wall of a continuous and integral inner surface structure for directly reacting to internal pressure loads through its wall in a closed loop load path of hoop tension, two spherical segments having a conical inner surface and a spherical outer surface complementary to the inner surface of said nozzle wall, said segments being pivotally mounted therein and rotatably adjustable from within the encased nozzle wall to vary the position of the conical inner surface for providing a smooth area reduction to a variable exit area nozzle choke plane; noise suppression elements incorporated into said spherical nozzle wall; actuator means for pivoting the spherical segments between a first and second position for a range of primary nozzle exit area variation in the nonsuppression mode and between a second and third position wherein the noise suppression elements are exposed to the flow of exhaust gases and divert flow radially outward of the nozzle wall through the noise suppression elements and thereby achieve noise suppression.

19. The variable area nozzle and noise suppressor set forth in claim 18, further including an afterburner section upstream of the pivotally mounted spherical segments wherein its combustion chamber is housed within said spherical nozzle wall such that the spherical nozzle wall reacts to the augmented pressure loads directly through hoop tension load paths in the nozzle wall.

20. The variable area nozzle and noise suppression system set forth in claim 18, further including a secondary nozzle downstream of said primary nozzle and noise suppression spokes retractably mounted within the secondary nozzle wall for extending radially inward from the secondary nozzle wall into the exit flow from the primary nozzle to break up the exhaust flow and thereby achieve noise suppression.

21. The variable area nozzle and noise suppression system set forth in claim 18, further including a secondary nozzle downstream of said primary nozzle and wherein said noise suppression elements incorporated into the spherical nozzle wall of the primary nozzle further include retractable noise suppression tubes having a segmented vane nozzle, which tubes are pivotally connected and retractably mounted with respect to the secondary nozzle for directing the jet exhaust stream gases from the interior of the spherical nozzle wall of the primary nozzle directly into the free stream flow in order to break up the exhaust gas flow into a plurality of small jet streams and thereby achieve noise suppression.

22. The variable area nozzle and noise suppression system as set forth in claim 23, wherein said noise suppression tubes having a segmented vane nozzle further include noise suppression spokes retractably mounted within the secondary nozzle wall to project radially inward from the secondary nozzle wall when in the extended position; linkage means connected to said noise suppression tubes and slaved to said noise suppression spokes for providing an over center linkage noise suppression locking mechanism for the tubes and spokes when in the stowed position.

23. The variable area nozzle and noise suppression system set forth in claim 22, further including blow-in doors extending radially inward from the secondary nozzle wall for admitting tertiary air into the exit flow from the extended spokes to ventilate the base area thereof, thereby reducing base drag of the noise suppression spokes.

24. The variable area nozzle and noise suppression system set forth in claim 25, further including trailing edge flaps pivotally mounted and aerodynamically actuated for varying the secondary nozzle exit area in response to pressure variations created by primary nozzle adjustments and tertiary air flow into the exit flow from the primary nozzle.

* * * * *

UNITED STATES PATENT OFFICE
CERTIFICATE OF CORRECTION

Patent No. 3,667,680     Dated June 6, 1972

Inventor(s) Willard N. Weed

It is certified that error appears in the above-identified patent and that said Letters Patent are hereby corrected as shown below:

On the cover sheet [72] the inventor's name

"Willare N. Weed" should appear -- Willard N. Weed --.

Signed and sealed this 12th day of December 1972.

(SEAL)
Attest:

EDWARD M. FLETCHER, JR.         ROBERT GOTTSCHALK
Attesting Officer               Commissioner of Patents